United States Patent
Laourine (10) Patent No.: US 10,400,365 B2
(45) Date of Patent: Sep. 3, 2019

(54) TWO-DIMENSIONAL FABRIC AND METHOD FOR THE PRODUCTION THEREOF

(71) Applicant: Groz-Beckert KG, Albstadt (DE)

(72) Inventor: Ezzeddine Laourine, Albstadt (DE)

(73) Assignee: Groz-Beckert KG, Albstadt (DE)

(*) Notice: Subject to any disclaimer, the term of this patent is extended or adjusted under 35 U.S.C. 154(b) by 72 days.

(21) Appl. No.: 15/737,665

(22) PCT Filed: Jun. 17, 2016

(86) PCT No.: PCT/EP2016/064067
§ 371 (c)(1),
(2) Date: Dec. 18, 2017

(87) PCT Pub. No.: WO2016/203007
PCT Pub. Date: Dec. 22, 2016

(65) Prior Publication Data
US 2018/0155858 A1 Jun. 7, 2018

(30) Foreign Application Priority Data
Jun. 18, 2015 (DE) .................. 10 2015 109 785

(51) Int. Cl.
*D03D 13/00* (2006.01)
*D03D 15/00* (2006.01)
(Continued)

(52) U.S. Cl.
CPC .............. *D03D 3/00* (2013.01); *D03D 13/00* (2013.01); *D03D 13/004* (2013.01); *D03D 15/00* (2013.01);
(Continued)

(58) Field of Classification Search
CPC ...... D10B 2505/02; D10B 2403/02411; B29B 11/16; D03D 13/00; D03D 25/005;
(Continued)

(56) References Cited

U.S. PATENT DOCUMENTS 3,100,003 A    8/1963   Feliks
5,112,421 A * 5/1992   Honda .................... B32B 5/00
                                                    156/148
(Continued)

FOREIGN PATENT DOCUMENTS

| DE | 102008036347 A1 | 2/2010 |
| DE | 102013011580 A1 | 1/2015 |
| JP | 2014181431 A1 | 9/2014 |

OTHER PUBLICATIONS

International Search Report in corresponding International Application No. PCT/EP2016/064067, dated Oct. 14, 2016, 5 pages.
(Continued)

*Primary Examiner* — Robert H Muromoto, Jr.
(74) *Attorney, Agent, or Firm* — Fitch, Even, Tabin, & Flannery LLP (57) ABSTRACT

A two-dimensional fabric (20) used to produce a three-dimensional composite part has a binding system (21) with binding warp threads (23) and/or binding weft threads (24) and a reinforcing system (22) with reinforcing weft threads (25) and/or reinforcing warp threads (26). At least some of the inserted reinforcing threads (25) are shortened reinforcing weft threads (25a) and/or shortened reinforcing warp threads (26a). Their thread length (L) is less than that of the binding weft threads (24) or the binding warp threads (23). The shortened reinforcing thread's (25a), (26a) free ends are located in a respective thread end position (30) or (31). The respective thread length (L) and the respective thread end positions (30), (31) of a shortened reinforcing thread (25a), (26a) in the two-dimensional fabric (20) are predetermined
(Continued)

based on the three-dimensional shape of the composite part to be produced to reduce cutting waste when producing preforms and cutting effort.

18 Claims, 8 Drawing Sheets

(51) Int. Cl.
| | |
|---|---|
| *D03D 3/00* | (2006.01) |
| *D03D 41/00* | (2006.01) |
| *D03D 47/18* | (2006.01) |
| *D03D 47/23* | (2006.01) |
| *D03D 47/39* | (2006.01) |
| *D03D 49/06* | (2006.01) |
| *D03D 49/70* | (2006.01) |
| *B29C 70/22* | (2006.01) |
| *B29K 671/00* | (2006.01) |

(52) U.S. Cl.
CPC .......... *D03D 41/008* (2013.01); *D03D 47/18* (2013.01); *D03D 47/23* (2013.01); *D03D 47/39* (2013.01); *D03D 49/06* (2013.01); *D03D 49/70* (2013.01); *B29C 70/22* (2013.01); *B29K 2671/12* (2013.01); *B29K 2713/00* (2013.01); *B29K 2995/0077* (2013.01); *D10B 2331/06* (2013.01); *D10B 2403/03* (2013.01); *D10B 2505/02* (2013.01)

(58) Field of Classification Search
CPC ........ D03D 15/00; D03D 13/004; D03D 1/00; D03D 3/00; D03D 15/02; B29C 45/0005; B29C 70/222
See application file for complete search history.

(56) References Cited

U.S. PATENT DOCUMENTS

| | | | | |
|---|---|---|---|---|
| 6,251,809 | B1* | 6/2001 | Creasy | B29C 70/14 |
| | | | | 428/196 |
| 6,446,675 | B1* | 9/2002 | Goering | D03D 25/005 |
| | | | | 139/11 |
| 10,161,067 | B2* | 12/2018 | Bischoff | D04H 3/002 |
| 10,190,239 | B2* | 1/2019 | Bischoff | B29C 70/22 |
| 2014/0342630 | A1* | 11/2014 | Amtmann | D03D 25/005 |
| | | | | 442/203 |
| 2015/0066144 | A1* | 3/2015 | Nies | A61L 27/427 |
| | | | | 623/16.11 |
| 2015/0210022 | A1* | 7/2015 | Pamplona | B29C 73/02 |
| | | | | 156/64 |
| 2018/0155858 | A1* | 6/2018 | Laourine | D03D 49/70 |

OTHER PUBLICATIONS

Office Action in corresponding German Application No. 10 2015 109 785.0, dated Mar. 9, 2015, 7 pages.
Article 34 Amendments in corresponidng International Application No. PCT/EP2016/064067, dated Apr. 6, 2017, 18 pages.
International Preliminary Report on Patentability in corresponding International Application No. PCT/EP2016/064067, dated May 29, 2017, 6 pages.

* cited by examiner

TWO-DIMENSIONAL FABRIC AND METHOD FOR THE PRODUCTION THEREOF

CROSS REFERENCE TO RELATED APPLICATIONS

This patent application is the national phase of PCT/EP2016/064067 filed Jun. 17, 2016 which claims the benefit of German Patent Application No. 10 2015 109 785.0 filed Jun. 18, 2015.

TECHNICAL FIELD

This invention relates to a two-dimensional woven fabric for use in producing three-dimensional composite parts and a method for producing such a two-dimensional fabric. Such composite parts are also designated as composites.

BACKGROUND

Two-dimensional woven fabrics for producing three-dimensional composite parts contain warp threads and/or weft threads made of a material that has tensile strength, such as, for instance carbon. In practice, difficulties frequently result if such two-dimensional woven fabrics are used for producing so-called "preforms". This involves laying one or more woven fabric layers on top of one another and preforming them, to produce from them, in further processing steps, the composite part in its desired three-dimensional shape. The preform simplifies the later processing into the final component shape. The preform is intended already to have approximately the three-dimensional shape that the later, final composite part is also intended to have. Therefore, producing the preform requires that the two-dimensional woven fabric can be draped into the desired three-dimensional shape with as few problems as possible, and later reshaped into the finished composite part.

Despite the required drapability of the woven fabric, it must nevertheless be ensured that the desired strength is achieved. Therefore, the reinforcing threads must assume a specified position or direction in the three-dimensional composite part. As a rule, the materials that serve for producing such reinforcing yarns are expensive. Producing the preform involves cutting the two-dimensional woven fabrics to shape. The excess woven fabric material that does not correspond to the desired shape of the preform is removed. This gives rise to a large amount of labor and a large proportion of material waste.

JP 2014 181431 A discloses a two-dimensional woven fabric, wherein reinforcing yarns are glued to the warp threads and/or weft threads only in a certain area that is later to be cut out. The places that are glued are later cut out of the finished two-dimensional woven fabric. Even this process involves a large amount of clippings and manual effort.

DE 10 2008 036 347 A1 describes a process for introducing, during the machine weaving process, weft threads that additionally extend partially into the woven fabric width. This is intended to allow machine production, using Jacquard power looms, for example, of reconstructions of old broché fabrics. To form the woven fabric pattern, it is possible to insert weft threads that do not extend over the entire woven fabric width, but rather are only integrated into one section of the warp beam.

DE 10 2013 011 580 A1 describes a two-dimensional woven fabric with reinforcing weft threads, that are woven in a variable width with all or only a portion of the warp threads.

SUMMARY

The goal of the invention can be considered to be to create a two-dimensional woven fabric and a method that increases the efficiency of producing a three-dimensional composite part.

The invention proposes a two-dimensional woven fabric that is intended for use in producing a three-dimensional composite part and that has reinforcing weft threads and reinforcing warp threads made of a reinforcing yarn. The reinforcing weft threads and reinforcing warp threads belong to a reinforcing system.

Moreover, the woven fabric has binding warp threads and/or binding weft threads made of a binding yarn that is different from the reinforcing yarn, these binding warp threads and/or binding weft threads belonging to a binding system and extending in a warp thread direction. The reinforcing yarn has higher tensile strength than the binding yarn does.

The two outermost binding warp threads, which have the largest possible distance from one another, define a warp beam width. The warp beam width is measured at right angles to the warp thread direction and can correspond to the woven fabric width, if optionally present reinforcing warp threads are located between the outermost binding warp threads. At least some of the reinforcing weft threads and/or reinforcing warp threads are in the form of shortened reinforcing threads. The shortened reinforcing threads have a thread length which is either smaller than the warp beam width, so that the reinforcing weft thread in question does not completely extend between the two outermost binding warp threads, or which is shorter than the woven fabric produced or shorter than the binding warp threads. The thread length of the shortened reinforcing threads and the respective thread end position of the two ends of each shortened reinforcing thread are determined on the basis of the three-dimensional composite part to be produced. The reinforcing threads or shortened reinforcing threads are already positioned during weaving to adapt them to the three-dimensional shape of the composite part or the preform to be produced later. This substantially reduces the amount of waste and especially the amount of reinforcing yarn to cut off. The reinforcing threads can be arranged in the two-dimensional woven fabric as floats not directly woven with the binding warp threads and binding weft threads, which improves the drapability and additionally ensures that the course of the reinforcing threads is as "stretched" as possible. This makes it possible to avoid a wave-shaped course of the reinforcing threads due to places where they are is woven. The reinforcing threads can also have places where they are woven by the technology of weaving with the binding warp threads and/or binding weft threads to improve the connection between the binding system and reinforcing system. Preferably, the reinforcing threads are arranged in the woven fabric to be as stretched as possible, with little waviness, for example by the weaving settings of the loom (weave type, thread tensions, etc.).

Predetermining the length and the exact position of the reinforcing threads in the two-dimensional woven fabric reduces the effort involved in producing preforms or the final three-dimensional composite part.

A three-dimensional composite part should be understood to be a shape in which the originally two-dimensional woven fabric is molded, extending beyond its thickness, at right angles to the original plane in which the two-dimensional woven fabric extended. Such three-dimensional composite parts can be used wherever high material strength is desired, while simultaneously keeping the weight small, for example in vehicle, airplane, or ship building.

The binding yarn and the reinforcing yarn preferably consist of different materials. In addition or alternatively, the binding yarn and the reinforcing yarn can have different cross-sectional areas and/or different cross sectional contours and/or different titers.

Examples of binding yarns that can be used are a plastic-containing yarn, for instance a phenoxy yarn.

In preferred sample embodiments the reinforcing yarn has carbon and/or aramid and/or ceramic and/or glass fibers and/or preloaded rovings, for example reinforcing bands made of the above-mentioned fibers.

The reinforcing yarn can be in the form of a reinforcing band, for example. In this case its cross section has a dimension that is greater in one direction than at right angles to this. For example, when the reinforcing yarn is viewed in cross section, its one dimension can be at least 4 times to 5 times greater than the respective other dimension. The reinforcing band is especially stiff to pushing, so that it can be pushed into the binding system in the form of a warp thread and/or weft thread.

As has already been described, it can be advantageous to provide a binding system made of binding weft threads and binding warp threads, which hold the reinforcing weft threads and/or reinforcing warp threads. It is preferred that the reinforcing weft threads and the binding weft threads be arranged without crossings and/or at a distance from one another in the warp thread direction. The reinforcing weft threads and the binding weft threads can correspondingly be arranged without crossings and/or at a distance from one another in the weft thread direction. In one sample embodiment, the binding warp threads and the binding weft threads can be connected with one another by the technology of weaving at places where they are woven between the reinforcing weft threads and/or reinforcing warp threads. The type of weave in the binding system can be selected as needed, and can also vary within the woven fabric. For example, an atlas weave, a body weave, a linen weave, or also a rotary weave can be provided.

In one sample embodiment, it is also possible for the reinforcing weft threads and/or reinforcing warp threads each to have one or more places where they are woven, where they are directly bound with one of the binding warp threads or binding weft threads. For example, such woven places can be present in the production of the two-dimensional woven fabric for preliminary fixation of the position of a reinforcing weft thread. These woven places are not provided in other embodiments of the woven fabric.

A two-dimensional woven fabric for use in producing a three-dimensional composite part can be produced as follows:

A loom is loaded with reinforcing weft threads and/or reinforcing warp threads made of a reinforcing yarn and with binding warp threads made of a binding yarn. In a preferred sample embodiment, binding weft threads made of a binding yarn are additionally present, which are additionally inserted in the reinforcing weft threads. As has been explained, the two outermost binding warp threads indicate the warp beam width.

The number and position of the reinforcing weft threads and/or reinforcing warp threads in the two-dimensional woven fabric are determined on the basis of the shape of the three-dimensional composite part to be produced, and the loom is set accordingly. Some of the reinforcing weft threads and/or reinforcing warp threads are in the form of shortened reinforcing threads, whose length is less than the warp beam width. For the shortened reinforcing threads, the length and the two thread end positions of the free ends of each shortened reinforcing thread is determined on the basis of the three-dimensional shape of the composite part to be produced, and the loom is set accordingly.

Before insertion of a reinforcing weft thread and/or reinforcing warp threads, the binding warp threads are put into the respective specified insertion position. Then, the at least one reinforcing weft thread and/or the at least one reinforcing warp thread is inserted from a thread supply. If it is a shortened reinforcing thread, it is possible to proceed as follows:

The free end of a reinforcing thread from the thread supply is inserted to a first thread end position of the reinforcing weft thread. Then, the reinforcing thread is cut at or next to the second thread end position.

In a preferred embodiment, this procedure can be performed by two grippers, which is described below.

The free end of a reinforcing thread from the thread supply is inserted with a first gripper to a first thread end position of the reinforcing thread or to a transfer position. At the transfer position or at the first thread end position the free end of the reinforcing thread is transferred to a second gripper. If the second gripper is located at the transfer position outside the first thread end position, the second gripper is then moved into the first thread end position. Simultaneously or after that, the first gripper is moved away from the second gripper to a second thread end position of the reinforcing thread. The reinforcing thread is held by the two grippers between the first thread end position and the second thread end position. Then, the reinforcing thread is cut at or next to the second thread end position. The first gripper is moved back with the free end of the reinforcing thread connected with the thread supply. Beforehand, simultaneously, or afterwards, the second gripper releases the inserted reinforcing thread at the first thread end position, and is moved away from the first thread end position. Finally, the inserted reinforcing thread is fixed with the help of the binding system.

It is preferred that the second gripper move away from the first gripper as it moves from the transfer position into the first thread end position of the reinforcing thread. If both grippers move away from one another as they move into the respective thread end positions, the reinforcing thread can be stretched tight between the grippers. However, as has already been explained, it is also possible for the transfer position already to coincide with the first thread end position.

The first gripper can have a holding device that can be switched between a clamping position that clamps the reinforcing thread and a guiding position that loosely surrounds the reinforcing thread. In this embodiment of the first gripper it is advantageous for the holding device to be switched out of the clamping position into the guiding position after the first gripper has transferred the free end of the reinforcing weft thread to the second gripper. Furthermore, it is preferred if the holding device is switched out of the guiding position into the clamping position if the first gripper has reached the second thread end position of the reinforcing thread. Then, the reinforcing thread or shortened reinforcing thread to be positioned in the two-dimensional woven fabric is held clamped between the two grippers.

In another advantageous embodiment, the first gripper has a cutting device. It is advantageous if the cutting device is actuated after the first gripper has reached the second thread end position of the reinforcing thread, in particular after the holding device has been switched out of the guiding position into the clamping position. The cutting device cuts the reinforcing thread, preferably at a place next to the holding device of the first gripper and between the holding device of the first gripper and the second gripper.

One preferred embodiment of the first gripper has, in addition to the holding device, a clamping device that can be switched between a clamping position that clamps the reinforcing thread and a release position that releases the reinforcing thread. Before the reinforcing thread is cut, both the holding device and also the clamping device can assume their respective clamping positions. In this case, the cutting place can be provided between the holding device and the clamping device.

Here it should be pointed out that the embodiment of the first gripper can also be used in a loom independently of the inventive method or the inventive two-dimensional woven fabric.

Another method that can be executed in addition to or in combination with this method involves inserting a reinforcing weft thread that is stiff to pushing or a reinforcing band that is stiff to pushing without the two grippers, as follows:

The free end of the reinforcing thread that is stiff to pushing is transported from the thread supply, for example unwound from a roll or bobbin, and pushed in to the first thread end position. Pulling by a gripper is not provided. The stiffness of the reinforcing thread is sufficient that a transport device next to the warp beam can push its free end to the first thread end position. Then, the reinforcing weft thread is cut by a cutting device at or next to the second thread end position.

The insertion of the thread can be supported by a medium, especially air. This support can be advantageous, e.g., in looms or woven fabrics of great width.

Between each two immediately adjacent binding warp threads, or next to the outermost binding warp threads of the warp beam, it is possible to arrange or position at least one conveyor device or at least one bobbin each of which can insert one reinforcing warp thread. A conveyor device inserts the reinforcing warp threads in the warp thread direction, preferably starting from a position next to the selvedge or on the side of the shed opposite the heald shafts. One or both sides of the warp beam can each have one conveyor device or a bobbin to insert a reinforcing weft thread weftwise. Depending on the shape of the woven fabric to be produced, there is, at the place where a reinforcing thread is supposed to be inserted, a conveyor device that can insert the reinforcing thread either weftwise as a reinforcing weft thread or warpwise as a reinforcing warp thread.

In particular, every conveyor device can be activated or driven individually and independently of the other conveyor devices to insert a reinforcing thread in question. It is possible for the conveyor devices in the form of bobbins for introducing the reinforcing warp threads to be arranged at least in groups on a common shaft, however rotatably mounted independently of one another. For example, every bobbin can be driven by a belt drive or in another suitable way independently of the other bobbins on the shaft.

Due to the limited space conditions, it is also possible to use space-saving electromagnets or piezo elements and design the drive to be incremental.

An especially advantageous possibility is for each of the one or more of the conveyor devices or bobbins to be associated with a cutting device, for example a cutting knife, which is or are actuated in coordination with the at least one associated conveyor device or bobbin in such a way that it automatically cuts the reinforcing thread when the drive changes direction.

The conveyor devices or bobbins can be movable so that they can be moved out of a rest position into an insertion position to insert the reinforcing thread. To accomplish this, every individual conveyor device or bobbin or group of conveyor devices or bobbins can have a positioning unit.

The reinforcing thread can be unwound for insertion above or below the axis of rotation of a bobbin.

Consequently, a reinforcing thread that is stiff to pushing can be inserted starting from the conveyor device by pushing in the warp thread direction or in the weft thread direction, without a gripper or additional means.

For example, applying a sizing agent to the reinforcing threads can make the reinforcing threads sufficiently stiff to pushing so that they can be pushed.

It is advantageous if a supporting surface is present to support the reinforcing thread. The supporting surface can be formed by a surface of a support body which is arranged next to the at least one conveyor device. The supporting surface extends in the plane in which the reinforcing threads are supposed to be inserted in the warp thread direction or weft thread direction. Preferably there is a common supporting surface for both the reinforcing weft threads and the reinforcing warp threads.

In a preferred sample embodiment, the support body can have a slot in it for each binding warp thread. The slots extend in a plane in which the binding warp thread in question is moved as the shed is opened and closed by the loom's heald shafts. Preferably, the slots are aligned in a vertical plane that is spanned by a vertical direction and the warp thread direction. The slots in the support body extend parallel to one another. The width of the slots is adapted to the thickness of the binding warp threads, preferably greater than the thickness of the binding warp threads, so that the latter can be introduced into the slots and moved back out of them as the shed is opened and closed, without getting caught on the corners and edges. The slots are open to the supporting surface. The reinforcing threads can be moved into the desired position pushing along the supporting surface on the support body, without branching off downward or bending downward. This increases the free length from the conveyor device that can be reached between the free end of the reinforcing thread and the respective associated conveyor device.

The reinforcing weft threads and/or reinforcing warp threads are generally designated in the application as reinforcing threads. The reinforcing threads can have a thermoplastic matrix. Inputting energy, for example heat, can connect or weld the reinforcing threads together at crossing points.

After the reinforcing threads with the predetermined thread length have been inserted and arranged at the predetermined thread end positions, the inserted reinforcing threads can be fixed in multiple steps. For example, an inserted reinforcing weft thread can be fixed by a shed change of only one or more binding warp threads. Moreover, in one embodiment at least one binding weft thread can be inserted before the shed change of these binding warp threads and/or before the insertion of a reinforcing warp thread. This preliminary binding can secure the position of the inserted reinforcing weft thread before the beating-up.

After the beating-up of the reinforcing weft thread, a shed change of additional binding warp threads can then be executed to fix the reinforcing weft thread.

As has been explained, it is also possible to introduce, in addition to the reinforcing weft threads, one or more reinforcing warp threads, each of which then extends between a determined first thread end position and a determined second thread end position of the reinforcing warp thread, the thread end positions of the respective reinforcing warp thread being determined analogously to the thread end positions of the reinforcing weft threads.

The reinforcing warp threads can be introduced with a gripper arrangement, as was explained above in connection with the reinforcing weft threads.

It is also possible to push the reinforcing warp threads in to a first thread end position of the reinforcing warp thread, analogously to the reinforcing weft threads, and to cut them at a second thread end position of the reinforcing warp thread, if the reinforcing warp threads are stiff to pushing.

BRIEF DESCRIPTION OF THE DRAWINGS

Advantageous embodiments of the invention follow from the dependent claims, the description, and the drawings. Preferred sample embodiments of the invention are explained in detail below using the attached drawings. The figures are as follows:

DETAILED DESCRIPTION

The invention relates to a two-dimensional woven fabric that is designed to be used in producing a three-dimensional composite part. A three-dimensional composite part is understood to be a part containing reinforcing threads made of a reinforcing yarn that has tensile strength, this part having a three-dimensional curved and/or bent shape. A three-dimensional shape is understood to be a shape that extends in a third dimension out of the plane in which the two-dimensional woven fabric extends, beyond its thickness. Such composite parts can be used in various applications, for example in vehicle, airplane, or ship building.

Figure 1:
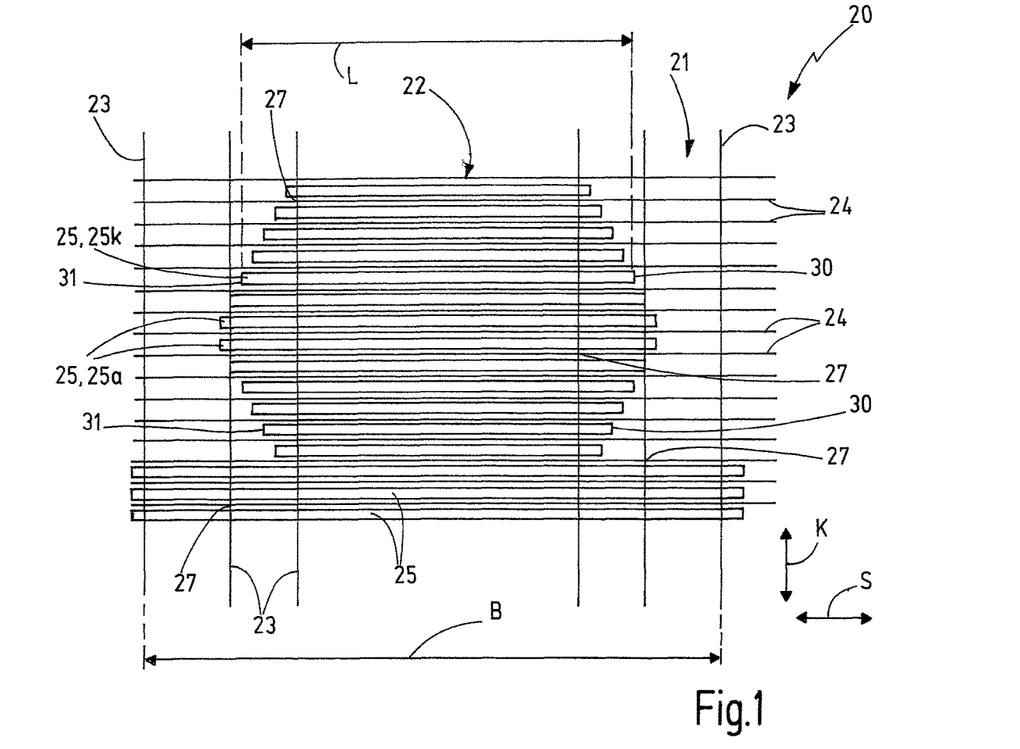
FIG. 1 is a greatly simplified schematic top view illustrating the principle of a two-dimensional woven fabric for producing a three-dimensional composite part.
Figure 2:
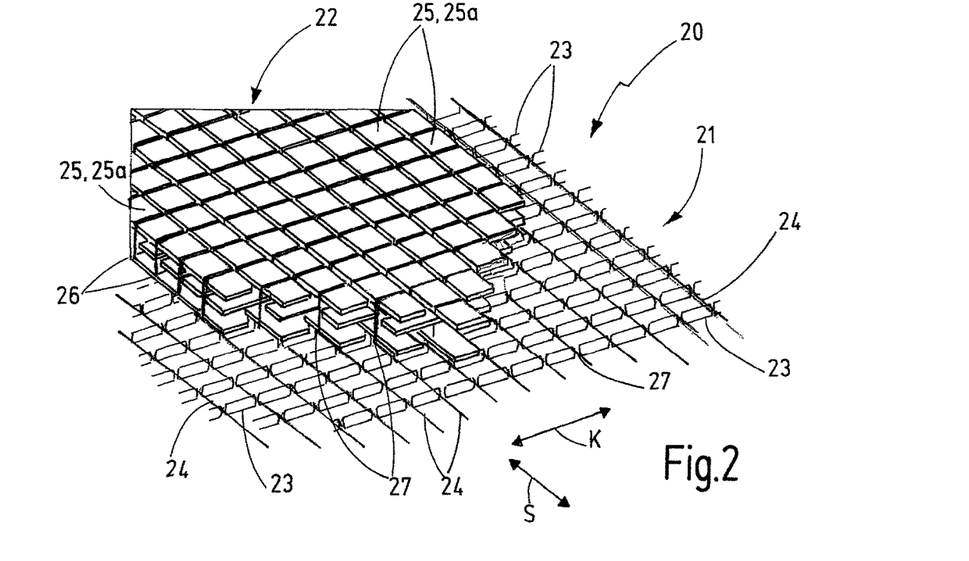
FIG. 2 is a perspective view of a two-dimensional woven fabric for producing a three-dimensional composite part.

FIGS. 1 and 2 schematically illustrate such a two-dimensional woven fabric 20. The two-dimensional woven fabric 20 has a binding system 21 and a reinforcing system 22. In the sample embodiment, the binding system 21 has binding warp threads 23 and binding weft threads 24. The binding warp threads 23 extend in a warp thread direction K. The direction at right angles to the warp thread direction K is designated as the weft thread direction S. In the sample embodiment of the two-dimensional woven fabric 20 illustrated here, the weft threads run in the weft thread direction S, at right angles to the warp threads. A possible variation of this is for the weft threads to be arranged at another angle with respect to the warp threads.

In the sample embodiment according to FIG. 1, the reinforcing system 22 has only reinforcing weft threads 25. Alternatively or in addition to the reinforcing weft threads 25, it is also possible for there to be reinforcing warp threads 26, examples of which are schematically suggested in FIG. 2. It can also be seen that the reinforcing threads 25, 26 in the reinforcing system 22 can be arranged in multiple layers.

The description generally discusses a reinforcing thread if at least one reinforcing weft thread 25 and/or at least one reinforcing warp thread 26 is meant.

In the preferred sample embodiments of the two-dimensional woven fabric 20 described here, the reinforcing weft threads 25 and the reinforcing warp threads 26 that are present are not directly bound together by the technology of weaving. Here the reinforcing weft threads 25 or the reinforcing warp threads 26 are held in the woven fabric 20 exclusively through the binding system 21 by means of the binding warp threads 23 and the binding weft threads 24. The binding weft threads 24 are connected together with the binding warp threads 23 at places where they are woven 27 by the technology of weaving. Any weave can be used, for example a linen weave, a body weave, an atlas weave, a rotary weave, etc. The binding system 21 holds the reinforcing system 22 in the two-dimensional woven fabric 20.

The reinforcing threads 25, 26 consist of a reinforcing yarn. The binding threads 23, 24 consist of a binding yarn. The reinforcing yarn can differ from the binding yarn with regard to the material and/or the cross section and/or the titer. The reinforcing yarn has higher tensile strength than the binding yarn does. In the sample embodiment, the reinforcing yarn is in the form of a reinforcing band and its cross section is larger in one dimension—according to the example at least 4 or 5 times larger—than in the respective other dimension.

The reinforcing yarn can have carbon fibers and/or aramid fibers and/or glass fibers or other plastic materials that have tensile strength. The reinforcing yarn can also have a thermoplastic matrix. The binding yarn is preferably in the form of plastic yarn, for example in the form of a phenoxy yarn.

FIGS. 1 and 2 schematically illustrate how the reinforcing weft threads 25 and the binding weft threads 24 run in the weft thread direction next to one another without crossings. The reinforcing weft threads 25 are preferably separated from one another in the warp thread direction K; according to the example, each two adjacent reinforcing weft threads 25 have one binding weft thread 24 arranged between them.

A possible variant of the preferred sample embodiment is for the reinforcing weft threads 25 to be, at least at one or more places, directly bound by the technology of weaving with one of the binding warp threads 23. This allows, for example before the beating-up of the reinforcing weft thread 25, preliminary securing of the reinforcing weft thread 25 in the weft thread direction S at the list.

The binding warp threads 23 arranged with maximum separation from one another in the weft thread direction S represent the two outermost binding warp threads 23, which define the warp beam width B (FIG. 1). For clarity, FIG. 1 shows only part of the binding warp threads 23. At least some of the reinforcing weft threads 25 do not extend over the entire warp beam width B. These reinforcing weft threads 25 are designated as shortened reinforcing weft threads 25a. Accordingly, the shortened reinforcing weft threads 25a each have a thread length L, which is less than the warp beam width B. The thread length L is only shown for one of the shortened reinforcing weft threads 25a in FIG. 1, as an example. As can be seen there, the shortened reinforcing weft threads 25a that are present can have different thread lengths L.

Figure 20:
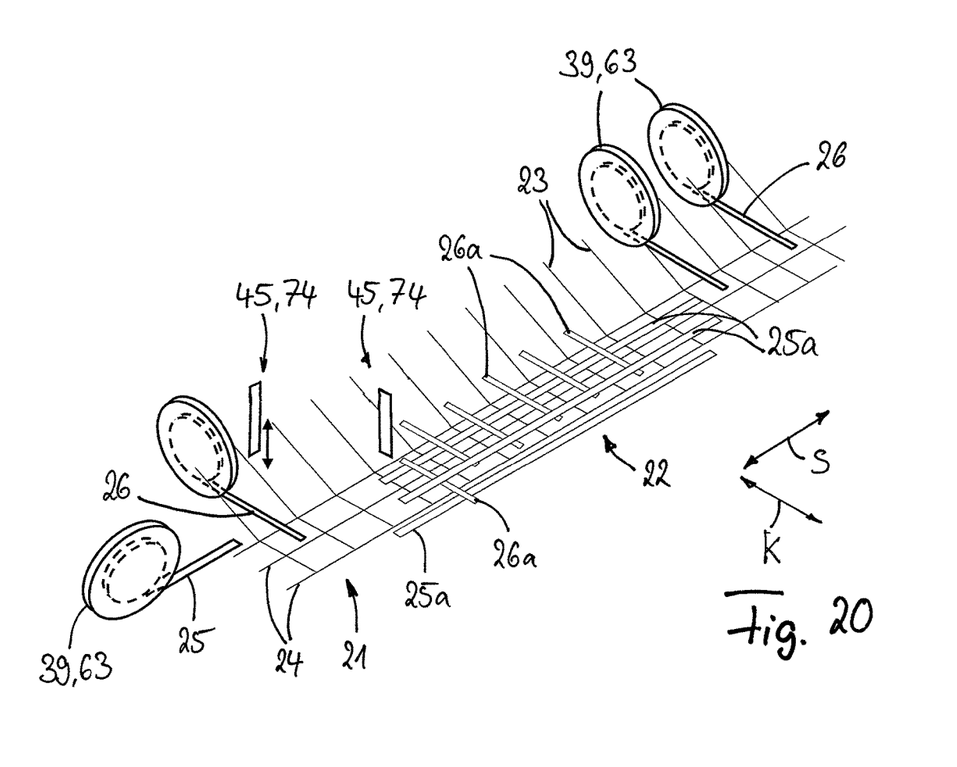
FIG. 20 is a schematic perspective view of an area of the shed with conveyor devices to insert reinforcing threads in the weft thread direction and warp thread direction.

Analogously, some of the reinforcing warp threads 26 are also in the form of in the form of shortened reinforcing warp threads 26a (FIG. 20). The shortened reinforcing warp threads 26a have a thread length L that is shorter, in the warp thread direction K, than the woven fabric that is produced. Consequently, the shortened reinforcing warp threads 26a extend in the warp thread direction K over only part of the two-dimensional woven fabric 20 that is produced. Consequently, the shortened reinforcing warp threads 26a are shorter than the binding warp threads 23 in the two-dimensional woven fabric 20.

Every shortened reinforcing weft thread 25a has two free ends in the weft thread direction S, the one end being arranged at a first thread end position 30 and the opposite end being arranged at a second thread end position 31 within the warp beam width B, or between the two outermost binding warp threads 23. Accordingly, a shortened reinforcing warp thread 26a has two free ends in the warp thread direction K, at the two thread end positions 30, 31. The two thread end positions 30, 31 and the thread length L between these two thread end positions 30, 31 of a shortened reinforcing thread 25a, 26a in the two-dimensional woven fabric 20 is determined on the basis of the three-dimensional composite part to be produced. Therefore, the two-dimensional woven fabric 20 is adapted to the three-dimensional shape of the 3D-composite part to be produced from it. This simplifies the subsequent processing steps, in particular the draping of the two-dimensional composite part into the desired three-dimensional shape, for example in order to produce a so-called preform in the framework of producing the composite part.

The fact that both the thread end positions 30, 31 and the thread length L are adapted to the three-dimensional shape to be achieved means that there is only a little cutting waste of the reinforcing yarn, or none at all. Since the reinforcing yarn frequently consists of very expensive material, this allows cost savings. Second, the need for elaborate finishing and shaping is eliminated by cutting the reinforcing system 22 to shape. The reinforcing system 22 with the reinforcing threads 25, 26 or the shortened reinforcing threads 25a, 26a are already located exactly in the position in which they are needed later when producing the preform or the three-dimensional composite part. When producing the preform or the three-dimensional composite part, the only thing that might still be required is to remove parts of the binding system 21. Since the binding system does not play any role in the strength of the composite part, and the binding yarn is economical in comparison with the reinforcing yarn, the cutting to shape of the binding system 21 and the resulting cutting waste are not a problem.

FIG. 1 schematically illustrates examples of shortened reinforcing weft threads 25a from which it is possible to produce a convex shape bulging out of the plane of projection, without requiring cutting waste of the reinforcing weft threads.

FIG. 3 through 11 are highly schematic illustrations of different situations or steps of a method for producing a two-dimensional woven fabric 20. The production method is explained below using these drawings.

A loom is loaded with the binding warp threads 23, the binding weft threads 24, and the reinforcing weft threads 25. The binding weft threads 24 are inserted in a way known in the art. The explanation below will cover especially the insertion and positioning of the shortened reinforcing weft threads 25a.

First, it is determined how the reinforcing weft threads 25 and the shortened reinforcing weft threads 25a should be arranged within the woven fabric, and the loom is set accordingly. In particular, the thread end positions 30, 31 of the ends of the shortened reinforcing weft threads 25a and the respective thread length L are set.

Figure 13:
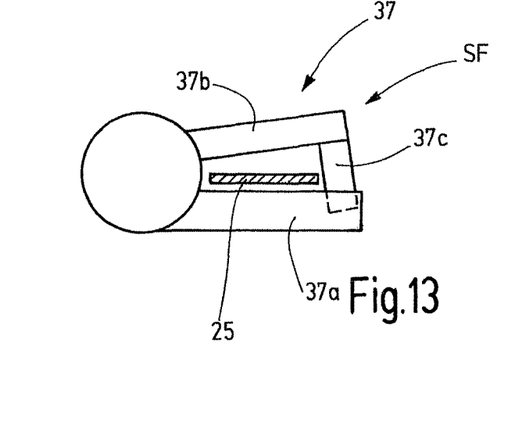
FIGS. 13 and 14 are each schematic block diagram-like representations of different states of a holding device of the gripper from FIG. 12.

To insert a shortened weft thread 25a, a first gripper 35 and a second gripper 36 are used. The first gripper has a holding device 37 and, according to the example, a clamping device 38. The holding device 37 can be switched between a clamping position SK (FIG. 14) that clamps the reinforcing weft thread 25 and a guiding position SF (FIG. 13) that surrounds or encloses the reinforcing weft thread 25. In the guiding position SF, the reinforcing weft thread 25 can be moved, in the direction in which it extends, relative to the holding device 37, and is only prevented from moving away from the first gripper 35 transverse to the direction in which it extends. The holding device 37 can—as is schematically shown in FIG. 13—form a type of eye, through which the reinforcing thread 25 runs in the guiding position SF, without being frictionally clamped.

The clamping device 38 can be switched between a release position in which it releases the reinforcing weft thread 25 and a clamping position SK, in which it clamps the reinforcing weft thread 25. It is also possible for the holding device 37 also to be able to assume a release position SL, in which the reinforcing weft thread 25 is completely released.

In FIG. 3 through 8, the respective release position SL is symbolized by a circle. The clamping position SK is symbolized by a cross. The guiding position SF is symbolized by two parallel lines.

The first gripper 35 is located on one side of the two-dimensional woven fabric 20 to be produced or on one side of the loom. This side also has a thread supply 39 for the reinforcing weft thread 25 arranged on it. The side that is opposite in the weft thread direction S is where the second gripper 36 is located.

Figure 3:
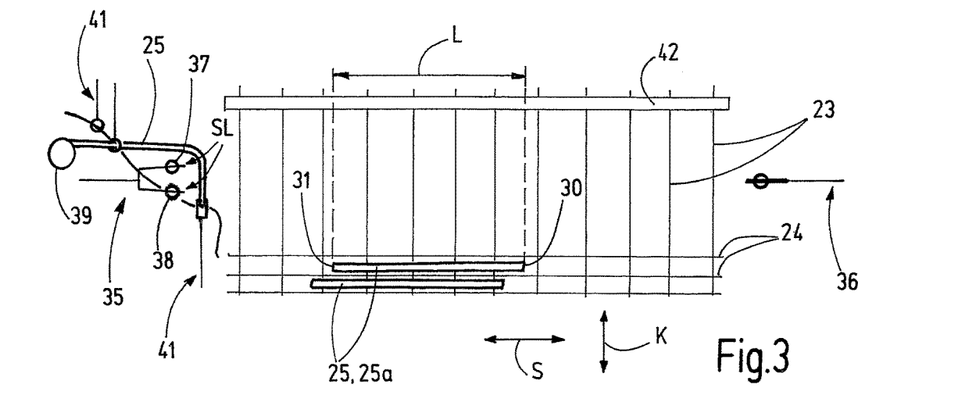
FIG. 3 through 11 each show different situations or steps of a method for producing a two-dimensional woven fabric.

In the initial situation, the holding device 37 and the clamping device 38 are in the release position SL (FIG. 3). Then, to insert a reinforcing weft thread, the free end of the reinforcing weft thread 25 stored in the thread supply 39, is gripped, according to the example by the clamping device 38, which is switched into its clamping position SK (FIG. 4).

After that, the free end of the reinforcing weft thread 25 is inserted, with the help of the first gripper 35, into the opened shed in the weft thread direction S. The binding warp threads 23 are located in a specified insertion position. This position depends on the type of the binding with the binding weft threads 24. In the sample embodiment, both the first gripper 35 and the second gripper 36 are moved into the opened shed (FIG. 5), until the two grippers 35, 36 have reached a transfer position 40. In the transfer position 40, the second gripper 36 grips the free end of the reinforcing weft thread 25. The clamping device 38 of the first gripper 35 is switched into its release position SL. No later than at this point in time, the holding device 37 is switched into its guiding position FS and guides the reinforcing weft thread 25 running through it (FIG. 6).

Figure 4:
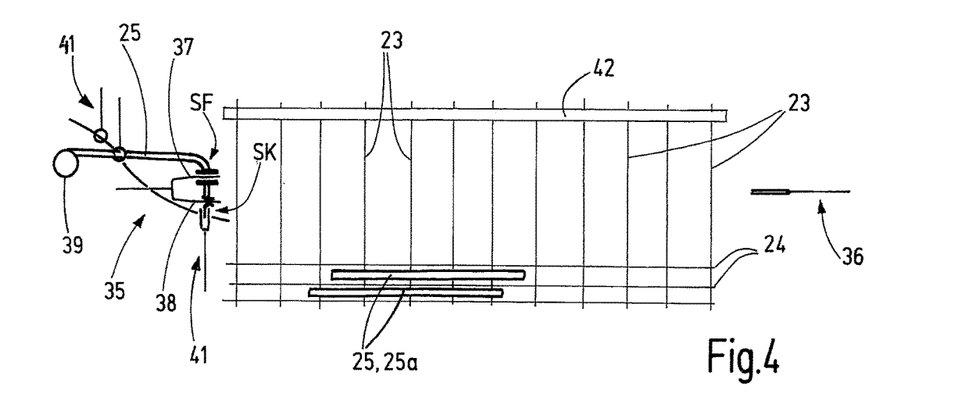
Figure 5:
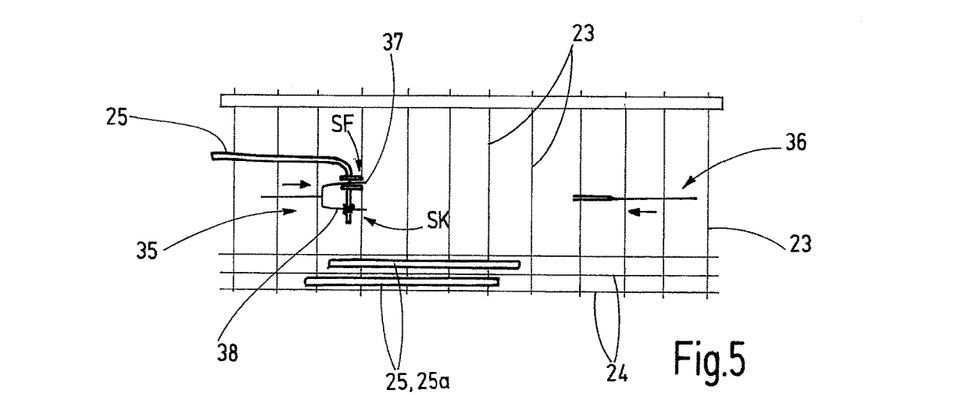
Figure 6:
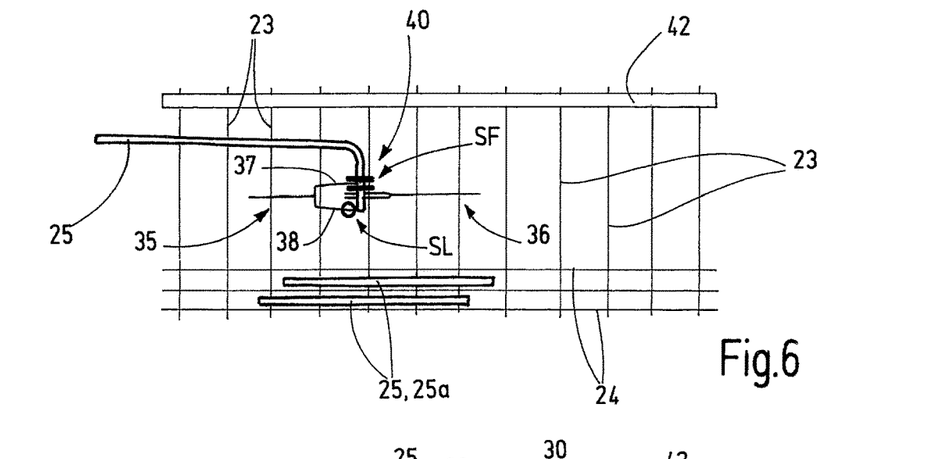

As is schematically illustrated in FIGS. 4 and 5, the holding device 37 can also be switched into its guiding position SF already before the transfer of the reinforcing weft thread 25 to the second gripper 36. According to the example, this switching already occurs when the free end of the reinforcing weft thread 25 is gripped by the first gripper 35, immediately before insertion into the shed. This has the advantage that the reinforcing weft thread 25 can be securely enclosed by the holding device 37 with the help of feeding means 41, as are schematically illustrated in FIGS. 3 and 4.

Figure 7:
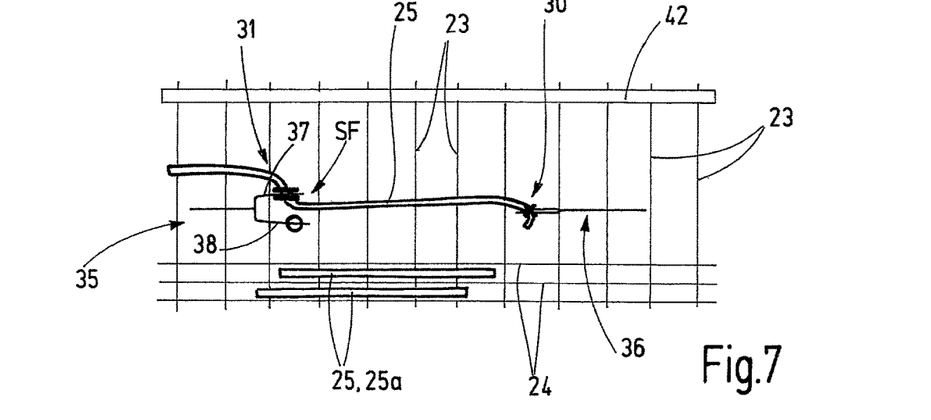

In one embodiment, the transfer position 40 can coincide with the first thread end position 30 of the shortened reinforcing weft thread 25a. In the sample embodiment illustrated here, the second gripper 36 is moved away from the first gripper 35, out of the transfer position 40 into the first thread end position 30 (FIG. 7). Likewise, the first gripper 35 is moved away from the second gripper 36 out of the transfer position 40 into the second thread end position 31. During this movement, the reinforcing weft thread 25 is held guided by the holding device 37 (guiding position SF) without clamping the reinforcing weft thread 25.

Figure 8:
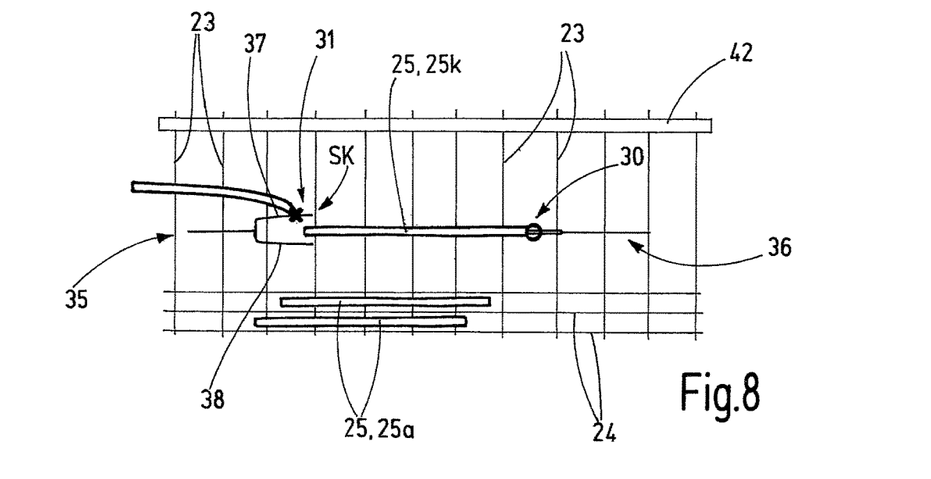

After the first gripper 35 has reached the second thread end position 31, the holding device 37 is switched out of guiding position SF into the clamping position SK. Following that, the reinforcing thread 25 is cut at the second thread end position 31. Simultaneously or subsequently, the inserted shortened reinforcing weft thread 25a is released by the second gripper 36 at the first thread end position 30 (FIG. 8).

Figure 9:
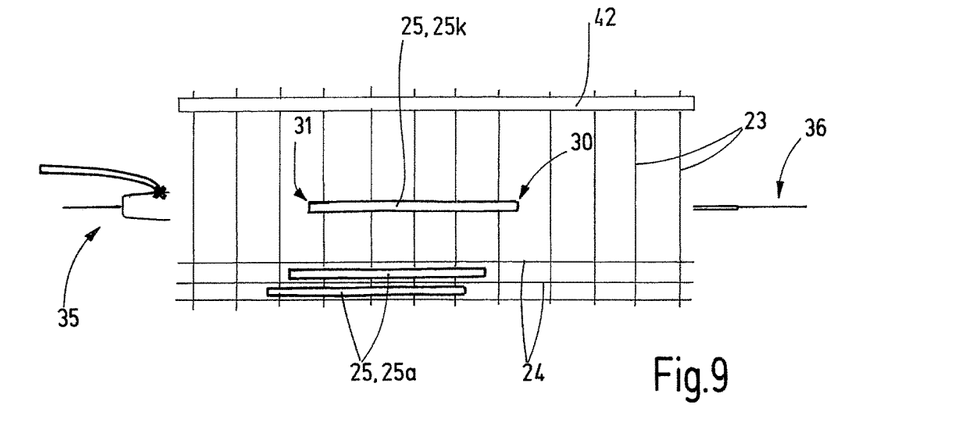

Following that, the two grippers 35, 36 can be pulled back out of the shed. The inserted shortened reinforcing weft thread 25a extends between the first thread end position 30 and the second thread end position 31 (FIG. 9).

Figure 10:
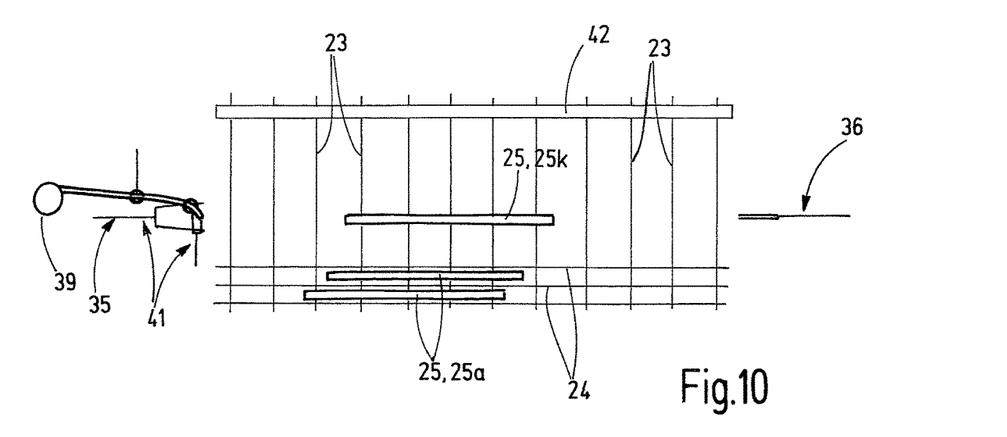
Figure 11:
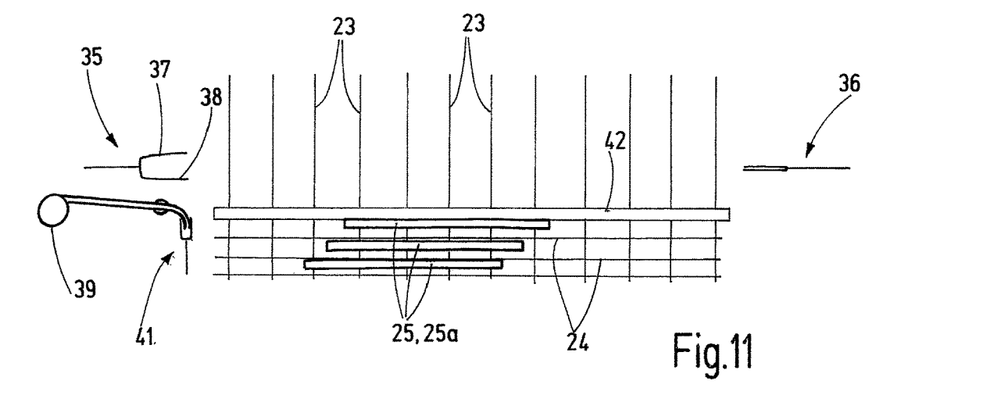

The first gripper 35 can transfer the free thread end of the reinforcing weft thread 25 connected with the thread supply 39 back to the feeding means 41 (FIGS. 10 and 11). Meanwhile, the inserted shortened reinforcing weft thread 25a can be beaten against the list in a way known in the art with the help of a reed 42 (FIG. 11).

Following that, in the sample embodiment a binding weft thread 24 is inserted and connected by the technology of weaving with the binding warp threads 23 through a corresponding shed change. Alternatively, it is also possible, before beating the shortened reinforcing weft thread, to insert the binding weft thread 24 into the shed. Then, both the inserted shortened reinforcing weft thread 25a and the binding weft thread 24 can be beaten through the reed 42.

In another optional embodiment of the method, the inserted shortened reinforcing weft thread 25a can be preliminarily secured in its position with the reed 42, before beating. This can done, for example, by having only part of the binding warp threads execute a shed change or position change for preliminary securing of the shortened reinforcing weft thread 25a, so that displacement of the inserted weft threads 25a or 24 with the reed 42 is still possible, however displacement in the weft thread direction S is simultaneously avoided.

FIG. 13 schematically illustrates, in a block diagram-like representation, an embodiment of a first gripper 35. As has been explained, the first gripper 35 has the holding device 37, the clamping device 38, and a cutting device 45. The holding device 37, the clamping device 38, and the cutting device 45 are located at a free end 46 of the first gripper 35. Starting from this free end 46, a gripper body 47 extends in the weft thread direction S. A gripper drive 48 can move the first gripper 35 in the weft thread direction S. For example, the gripper body 47 can have teeth, and a drive gear of the gripper driver 48 can also have teeth, and these teeth can engage, so that the gripper body 47 moves in the weft thread direction S as the drive gear rotates.

The gripper body 47 has a first actuation unit 49 for the holding device 37 arranged on it, and this first actuation unit 49 is coupled, through first coupling means 50, for example a first coupling rod 51, with the holding device 37. Moving the first coupling rod 51 in the weft thread direction S can switch the holding device 37 between its positions.

Figure 14:
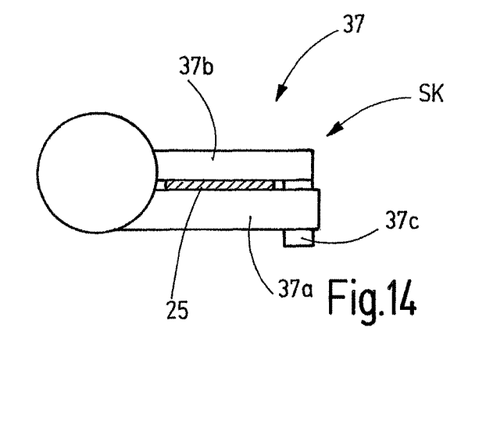
Figure 15:
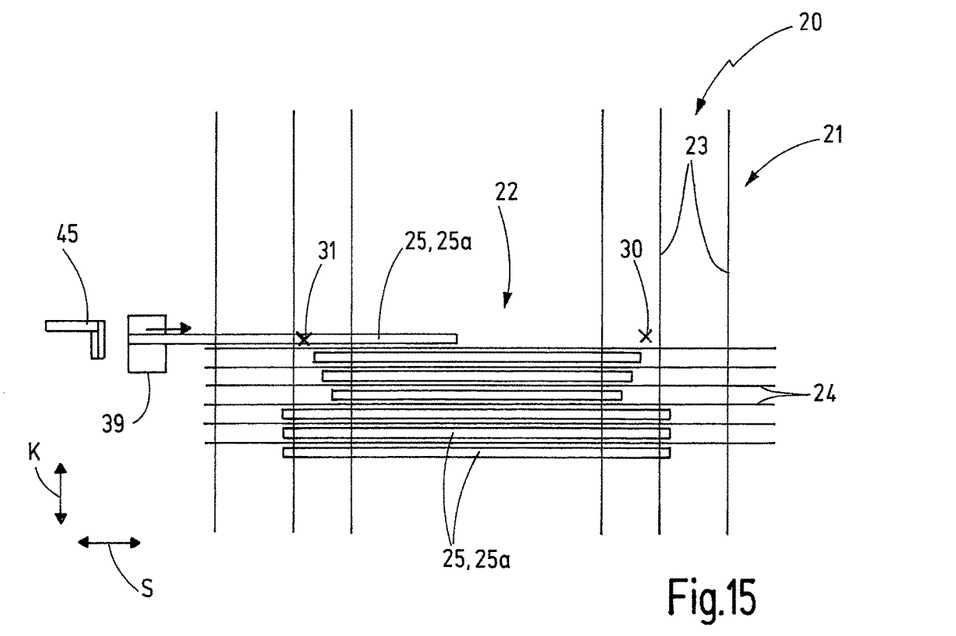
FIGS. 15 and 16 are each schematic block diagram-like representations of different situations or steps in a method for insertion of a reinforcing warp thread that is stiff to pushing for producing a two-dimensional woven fabric.
Figure 16:
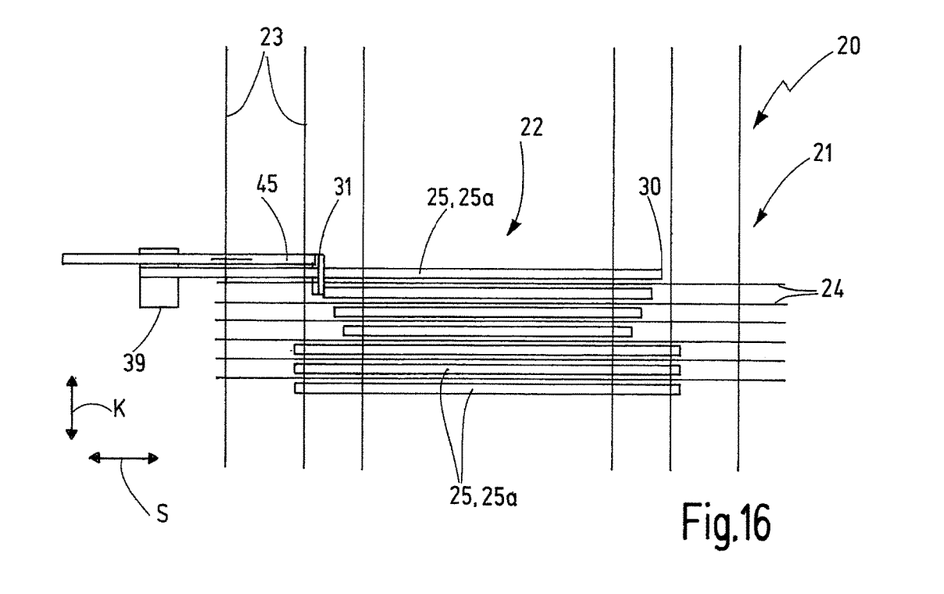

A highly schematic representation of the holding device 37 is reproduced in FIGS. 13 and 14. The holding device 37 has a first holding jaw 37a and a second holding jaw 37b, which are movable relative to one another. In the clamping position SK, the reinforcing weft thread 25 is frictionally held between the two holding jaws 37a and 37b (FIG. 14). In the guiding position SF, the reinforcing weft thread 25 runs between the two holding jaws 37a, 37b without clamping action, and it is surrounded by them in a peripheral direction, so that it cannot get out of the area between the two holding jaws 37a, 37b. For this purpose, it is possible, for example, for at least one of the two clamping jaws 37a and 37b to have a projection 37c on it that closes the lateral gap between the two holding jaws 37a, 37b if the holding device 37 is outside the clamping position SK and assumes the guiding position SF (FIG. 13). The release position SL of the holding device 37 is not explicitly illustrated. In the release position SL, the separation of the two holding jaws 37a, 37b is large enough that a gap results and the holding device 37 can be moved away from the reinforcing weft thread 25 transverse to the direction in which it extends.

Moreover, the first gripper 35 has a second actuation unit 52, which is coupled with the clamping device 38 through second coupling means 53 that are formed, according to the example, by a second coupling rod 54. The second actuation unit 52 and the second coupling means 53 can switch the clamping device 38 between the clamping position SK and the release position SL. The clamping device 38 can have, analogously to the holding device, two clamping jaws 38a, 38b, which are movable relative to one another and therefore can be switched between a clamping position SK and a release position SL. The clamping device 38 does not have a guiding position SF.

Figure 12:
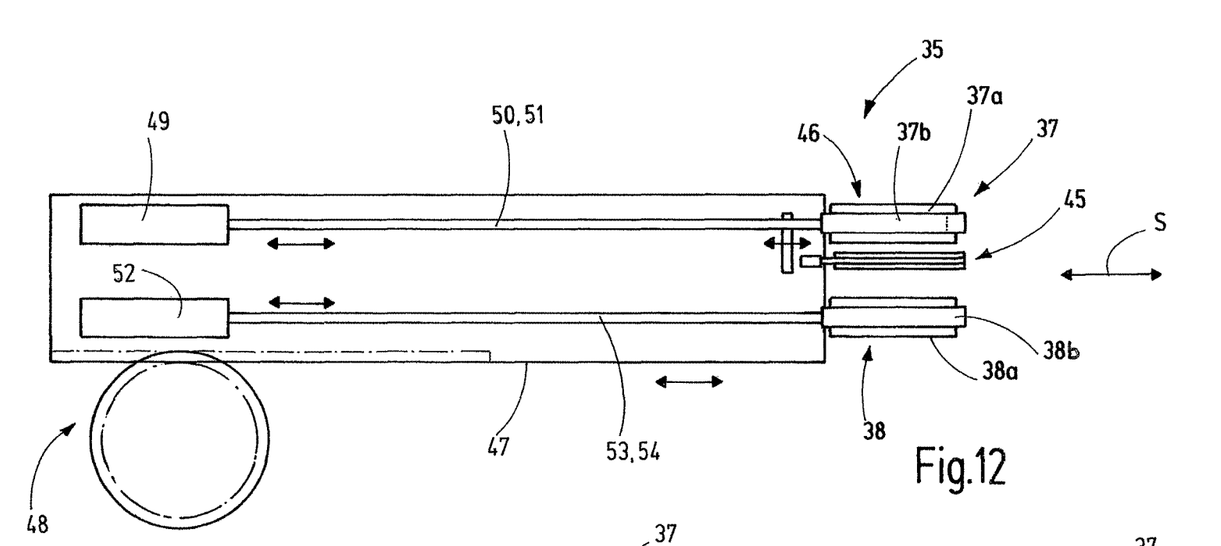
FIG. 12 is a schematic block diagram-like representation of a first gripper for use in producing a two-dimensional woven fabric.

The cutting device 45 serves to cut the inserted reinforcing weft thread 25 at the second thread end position 31. It is arranged next to the holding device 37 and, according to the example, between the holding device 37 and the clamping device 38. The cutting device 45 is actuated when the holding device 37 is switched into its clamping position SK. Therefore, it is possible to couple the cutting device 45 with the first actuation unit 49 or the first coupling means 45, so that after the clamping position SK is reached the cutting device 45 is actuated to cut the reinforcing weft thread 25. Such coupling means are schematically illustrated in FIG. 12. Alternatively, it is also possible to provide a separate third actuation unit that is coupled with the cutting device 45.

As is schematically illustrated in FIG. 12, the coupling means 50, 53 are each formed by one coupling rod 51, 54, which is arranged on the gripper body 47. The coupling rods 51, 54 can be accessible from outside in at least one section and can be moved relative to the gripper body 47 in the direction in which they extend by drive gears to cause the relevant actuation or switching of the associated device 37, 38, 45. It goes without saying that other coupling means, for example belts or rotating shafts or something of that kind can also be provided. The embodiment of the first gripper 35 with a clamping device 38 and a holding device 37 that can be switched between a guiding position SF and a clamping position SK as central principal features can also be used independently of the inventive method described here or the inventive embodiment of the two-dimensional woven fabric 20.

The above-described method using the grippers 35, 36 could also be used to insert and position or possibly cut a reinforcing warp thread 26 at the specified thread end positions 30, 31 to form a shortened reinforcing warp thread 26a.

In another method, a reinforcing thread 25, 16 that is stiff to pushing or a shortened reinforcing thread 25a, 26a that is stiff to pushing can be inserted without the two grippers, which will be explained below using FIGS. 15 through 21.

Figure 17:
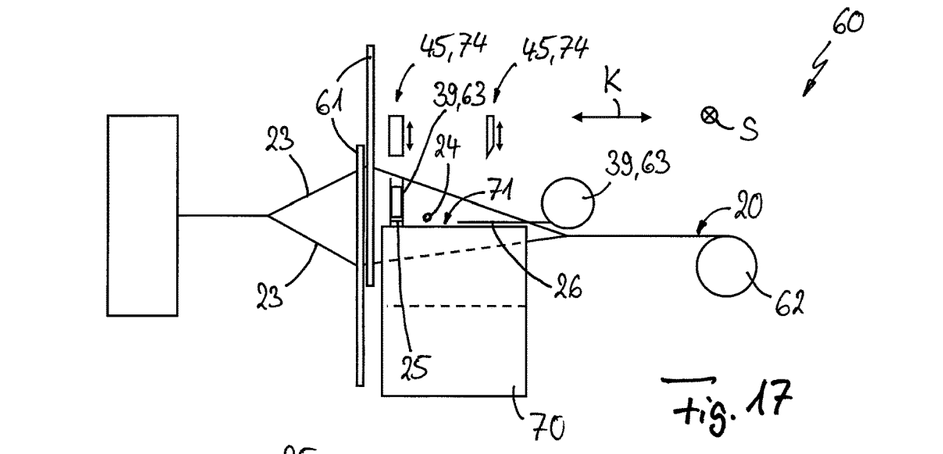
FIG. 17 is a schematic block diagram-like representation of a sample embodiment of a loom.

FIG. 17 schematically illustrates the principle of a loom 60 with heald shafts 61; for simplicity only two heald shafts 61 are shown. The number of heald shafts 61 will vary depending on the binding to be produced and the woven fabric. The heald shafts 61 guide the binding warp threads 23. Depending on the position of the heald shafts 61, a corresponding shed in the binding system 21 is opened or closed.

Figure 21:
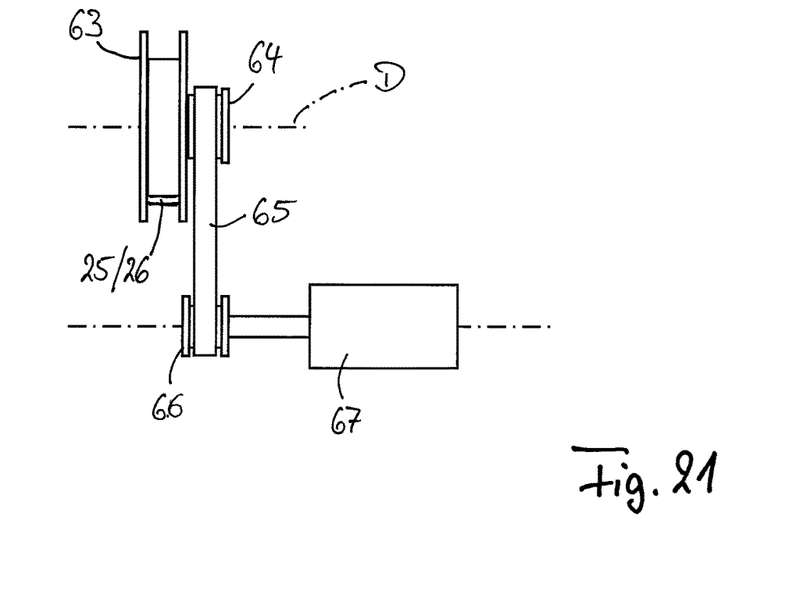
FIG. 21 is a schematic block diagram-like representation of a sample embodiment for individual drive of a conveyor device from FIG. 20.

Between a woven fabric draw-off 62 and the heald shafts 61 there is, for each reinforcing thread 25, 26, a thread supply 39 in the form of a bobbin 63. Each bobbin 63 can be driven about its axis of rotation D separately and independently of the other bobbins 63. For example, every bobbin 63 can have a driven gear 64 which has a drive connection, through a belt 65 or another coupling element, with a drive gear 66 (FIG. 21). The drive gear 66 is driven through a motor 67. Consequently, the motor 67 can be arranged remotely from the axis of rotation D of the bobbin 63.

It is also possible to use other known drives for driving the bobbins.

FIG. 20 schematically represents multiple bobbins 63, each of which supplies a reinforcing warp thread 26. These bobbins 63 can be rotatably mounted on a common shaft, however even in this case they can be driven individually and independently of one another.

Rotating a bobbin 63 unwinds the reinforcing thread 25, 26 in question and lays it down on the binding warp threads 23 or the binding weft threads 24 in the area of the shed.

Figure 18:
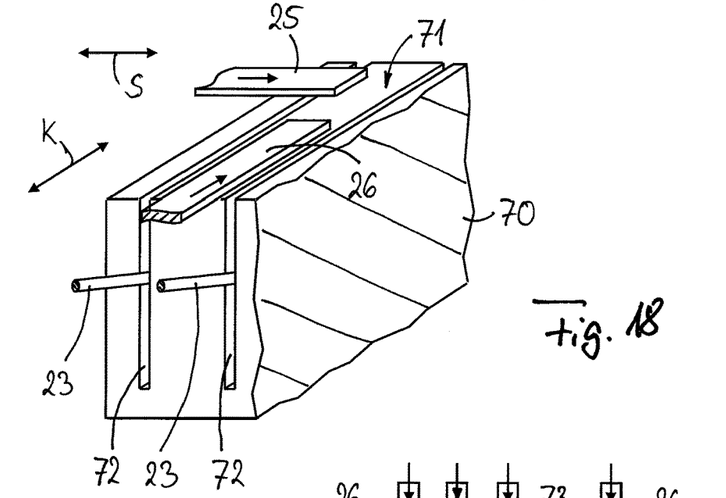
FIG. 18 is a schematic perspective view of a support body with a supporting surface for the reinforcing threads.
Figure 19:
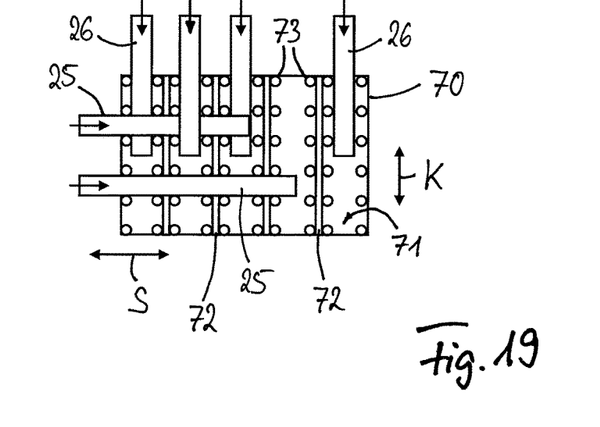
FIG. 19 is a schematic top view of a variant embodiment of a supporting surface of a support body.

In another embodiment, a support body 70 can be present to support the reinforcing threads 25, 26. The support body 70 is schematically illustrated in FIGS. 17-19. On its top, the support body 70 has a supporting surface 71 for the reinforcing threads 25, 26. The supporting surface 71 preferably extends in a horizontal plane. In the warp thread direction K, the supporting surface has slots 72 cut through it. The slots 72 are open on the front and the back of the support body 70 toward the supporting surface 71 and in the warp thread direction K. The slots 72 are wider than the thickness of a binding warp thread 73. They are arranged so that the binding warp threads 23 have the corresponding separation in the weft thread direction S. As is illustrated in FIGS. 17 and 18, as the shed is formed one binding warp thread 23 can enter each slot 72 and pass through the support body 70 in the slot 72. Simultaneously, the supporting surface 71 for the reinforcing threads 25, 26 is present above, in the area of the shed. As the reinforcing threads 25, 26 are unwound from the bobbins 63 and pushed, these reinforcing threads 25, 26 slide along the supporting surface 71 into the desired position.

The reinforcing warp threads 26 and the reinforcing weft threads 25 can also be pushed on top of one another on the supporting surface 71, as is schematically illustrated in FIG. 19. The order in which the reinforcing threads 25, 26 are pushed onto the supporting surface 71 can correspondingly arrange them as interlaid scrim and/or as a woven reinforcing system 22.

To improve the guidance of the reinforcing threads 25, 26 on the supporting surface 71, it can have guide elements and, for example, cylindrical guide pins 73 arranged on it, which project at right angles to the supporting surface 71. The guide elements can also have another shape, for example a hemispherical shape or something of that kind. The guide pins 73 that are present according to the example are arranged on both sides of a respective slot 72 in the warp thread direction K. Another row of guide pins 73 can be present at the respective outside edge of the supporting surface 71. Each two rows of guide pins 73 that are immediately adjacent in the warp thread direction K form a guideway for a reinforcing weft thread 25. Each two rows of guide pins 73 that are adjacent in the weft thread direction S and that are arranged between two slots 72 form a guideway for a reinforcing warp thread 26. Thus, the guide elements and, according to the example, guide pins 73 produce a grid on the supporting surface 71 that serves for positioning, guidance, and lateral support of the reinforcing threads 25, 26.

The free end of the reinforcing thread 25, 26 that is stiff to pushing or of the shortened reinforcing thread 25a, 26a that is stiff to pushing is transported from the thread supply 39, for example unwound from the bobbin 63, and pushed in to the first thread end position 30. The reinforcing thread 25, 26 that is stiff to pushing is sufficiently stiff in the direction in which it extends that it need not be pulled, but rather can be pushed by a suitable conveyor device. The conveyor device can, as in the example described here, be formed by a drivable thread supply 39 or another suitable drive, for example a drivable bobbin 63. Pulling by a gripper is not provided here. The conveyor device or the thread supply 39 or the bobbin 63 pushes the free end of the shortened reinforcing thread 25a, 26a to the first thread end position 30.

Then, the shortened reinforcing weft thread 25a is cut by a cutting device 45 at or next to the second thread end position 31. The cutting at the second thread end position 31 by the cutting device 45 can be coordinated with the drive of the conveyor device or the bobbin 63. The cutting can occur as soon as the free end has reached the first thread end position 30 and/or if the drive of the conveyor device or the bobbin 63 reverses its direction of rotation. Reversing the direction of rotation can facilitate the cutting. Reversing the direction of rotation can convey a thread section between the conveyor device or the bobbin 63 and the second thread end position 31 backward, in particular wind it back onto the bobbin 63.

The cutting device 45 can be positionable, in the weft thread direction S and/or in the warp thread direction K, at the second thread end position 31. It is also possible to associate a cutting device 45 with every conveyor device or bobbin 63. The cutting device 45 can also be arranged so that it is movable or positionable together with the associated conveyor device or bobbin 63.

The loom 60 has at least one cutting knife 74 that serves as cutting device 45. Every thread supply 39 or every bobbin 63 can have a separate cutting knife 74 associated with it. In one sample embodiment it is also possible for there to be one cutting knife 74 for cutting the at least one reinforcing weft thread 25 and one other cutting knife 74 for cutting the at least one reinforcing warp thread 26 (FIG. 20). In this case, the cutting knives 74 can be moved in the warp thread direction K and in the weft thread direction S. If every bobbin 63 is associated with a separate cutting knife 74, it is sufficient if the respectively associated cutting knife 74 for a reinforcing warp thread 26 is positionable in the warp thread direction K and if that for a reinforcing weft thread 25 is positionable in the weft thread direction S. To cut the reinforcing thread 25, 26 in question, the cutting knives 74 can additionally be moved in a perpendicular direction. To cut the reinforcing threads 25, 26, they can interact with the support body 70.

As an alternative to the cutting knives 74, it is also possible to provide at least one scissors-like cutting device 45.

The above discussion has explained sample embodiments of processes for introducing reinforcing weft threads 25. In the same way it is also possible to introduce reinforcing warp threads 26 into the reinforcing system 22 of the woven fabric 20.

The invention relates to a two-dimensional woven fabric 20 and a method for producing it. The two-dimensional woven fabric 20 is used to produce a three-dimensional composite part. The two-dimensional woven fabric has a binding system 21 with binding warp threads 23 and/or binding weft threads 24 and a reinforcing system 22 with reinforcing weft threads 25 and/or reinforcing warp threads 26. At least some of the inserted reinforcing threads 25 are in the form of shortened reinforcing weft threads 25a and/or shortened reinforcing warp threads 26a. Their thread length L is less than that of the binding weft threads 24 or the binding warp threads 23. The shortened reinforcing thread 25a, 26a extends between its free ends, which are located in a respective thread end position 30 or 31. The respective thread length L and the respective thread end positions 30, 31 of a shortened reinforcing thread 25a, 26a in the two-dimensional woven fabric 20 are predetermined on the basis of the three-dimensional shape of the composite part to be produced. This makes it possible to reduce cutting waste when producing preforms and the effort to cut the reinforcing threads 25, 26.

LIST OF REFERENCE NUMBERS

20 Two-dimensional woven fabric
21 Binding system
22 Reinforcing system
23 Binding warp thread
24 Binding weft thread
25 Reinforcing weft thread
25a Shortened reinforcing weft thread
26 Reinforcing warp thread
26a Shortened reinforcing warp thread
27 Woven places
30 First thread end position
31 Second thread end position
35 First gripper
36 Second gripper
37 Holding device
37a First holding jaw
37b Second holding jaw
37c Projection
38 Clamping device
38a First clamping jaw
38b Second clamping jaw
39 Thread supply
40 Transfer position
41 Feeding means
45 Cutting device
46 Free end of first gripper
47 Gripper body
48 Gripper drive
49 First actuation unit
50 First coupling means
51 First coupling rod
52 Second actuation unit
53 Second coupling means
54 Second coupling rod
60 Loom
61 Heald shaft
62 Woven fabric draw-off
63 Bobbin
64 Driven gear
65 Belt
66 Driving gear
67 Motor
70 Support body
71 Supporting surface
72 Slot
73 Guide pin
74 Cutting knife
B Warp beam width
D Axis of rotation
K Warp thread direction
L Thread length
S Weft thread direction
SF Guiding position
SK Clamping position
SL Release position

The invention claimed is:

1. A two-dimensional woven fabric (20) for use in producing a three-dimensional composite part, the two-dimensional woven fabric comprising:
    reinforcing weft threads (25) and reinforcing warp threads (26) that are made of a reinforcing yarn and that belong to a reinforcing system (22),
    binding warp threads (23) made of a binding yarn that is different from the reinforcing yarn, these binding warp threads belonging to a binding system (21) and extending in a warp thread direction (K),
    wherein the reinforcing yarn has a higher tensile strength than the binding yarn,
    wherein a distance between two outermost of the binding warp threads (23) arranged with maximum separation at right angles to the warp thread direction (K) defines a warp beam width (B),
    wherein at least some of the reinforcing weft threads (25) and reinforcing warp threads (26) are shortened reinforcing threads (25a, 26a) which either have a thread length (L) that is less than the warp beam width (B) or that is less than a length of the produced woven fabric (20) in the warp thread direction (K),
    and wherein thread end positions (30, 31) of ends of the shortened reinforcing threads (25a, 26a) and their thread length (L) are determined based on the three-dimensional composite part to be produced.

2. A two-dimensional woven fabric according to claim 1, wherein the reinforcing yarn is has a form of a reinforcing band.

3. A two-dimensional woven fabric according to claim 1, wherein one or both of:
  the reinforcing warp threads (26) and the binding warp threads (23) are arranged without crossings, or
  the binding system (21) has binding weft threads (24), the reinforcing weft threads (25) and the binding weft threads (24) being arranged without crossings.

4. A two-dimensional woven fabric according to claim 3, wherein the binding weft threads (24) are made of binding yarn.

5. A two-dimensional woven fabric according to claim 3, wherein one or both of the reinforcing weft threads (25) or reinforcing warp threads (26) are arranged without a location where they are woven by weaving with the binding warp threads (23) and binding weft threads (24) of the binding system (21) and are held by the binding system (21).

6. A two-dimensional woven fabric according to claim 1, wherein one or both of the reinforcing weft threads (25) or reinforcing warp threads (26) have at least one binding location where they are directly bound with one of the binding warp threads (23) or binding weft threads (24) of the binding system (21).

7. A method for producing a two-dimensional woven fabric (20), the method comprising:
  Loading a loom with reinforcing weft threads (25) and reinforcing warp threads (26) that are made of a reinforcing yarn and that belong to a reinforcing system (22);
  Loading the loom with binding warp threads (23) that are made of a binding yarn different from the reinforcing yarn and that belong to a binding system (21) and that extend in a warp thread direction (K), wherein a distance between two outermost binding warp threads (23) arranged with maximum distance at right angles to the warp thread direction (K) defines a warp beam width (B);
  Determining a number and position of the reinforcing weft threads (25) and reinforcing warp threads (26) in the two-dimensional fabric (20) based on a shape of a three-dimensional composite part to be produced, at least some of the reinforcing weft threads (25) and reinforcing warp threads (26) being shortened reinforcing threads (25a, 26a), which have a thread length (L) that is smaller than the warp beam width (B) or smaller than a length of the fabric (20) to be produced in the warp thread direction (K), and thread end positions (30, 31) of the two ends of each shortened reinforcing thread (25a, 26a) and its respective thread length (L) being determined based on a three-dimensional composite part to be produced, and the loom being set accordingly;
  Positioning heald shafts of the loom in an insertion position to insert one or both of at least one reinforcing weft thread (25) or at least one reinforcing warp thread (26);
  Inserting a free end of a reinforcing weft thread (25) and reinforcing warp thread (26) from a thread supply (39) to a first thread end position (30) of a respective reinforcing thread (25, 26);
  Cutting the inserted reinforcing thread (25, 26) at a second thread end position (31);
  Fixing the inserted reinforcing thread (25, 26) by the binding system (21).

8. A method for producing a two-dimensional woven fabric (20) according to claim 7, further comprising moving one or both of the at least one reinforcing weft thread (25) or the at least one reinforcing warp thread (26) by pushing until its free end has reached the first thread end position (30).

9. A method for producing a two-dimensional woven fabric (20) according to claim 8, further comprising cutting the reinforcing thread (25, 26) that has been pushed in to the first thread end position by a movable cutting device (45) at the second thread end position (31).

10. A method for producing a two-dimensional woven fabric (20) according to claim 9, further comprising pushing the reinforcing thread (25, 26) by unwinding it from a drivable bobbin (63) rotating about an axis of rotation (D).

11. A method for producing a two-dimensional woven fabric (20) according to claim 8, further comprising supporting the at least one reinforcing thread (25, 26) as it is pushed with a supporting surface (71).

12. A method for producing a two-dimensional woven fabric (20) according to claim 7 and further comprising:
  Inserting the free end of the reinforcing weft thread (25) from the thread supply (39) with a first gripper (35) to the first thread end position (30) of the reinforcing weft thread (25) or to a transfer position (40) and transferring the free end of the reinforcing weft thread (25) to a second gripper (36);
  Moving the first gripper (35) to the second thread end position (31) of the reinforcing weft thread (25) and holding the reinforcing weft thread (25) next to the second thread end position (31);
  Cutting the reinforcing weft thread (25) at the second thread end position (31);
  Moving the first gripper (35) with the free end of the reinforcing weft thread (25) connected with the thread supply (39) away from the second thread end position (31);
  Fixing the inserted reinforcing weft thread (25) by the binding system (21).

13. A method according to claim 12, further comprising moving the second gripper (36) out of the transfer position (40) into the first thread end position (30) of the reinforcing weft thread (25), if the transfer position (40) does not coincide with the first thread end position (30) of the reinforcing weft thread (25).

14. A method according to claim 13, wherein as the second gripper (36) moves out of the transfer position (40) into the first thread end position (30) of the reinforcing weft thread (25) its motion moves it away from the first gripper (35).

15. A method according to claim 12, further comprising switching a holding device (37) of the first gripper (35) between a clamping position (SK) that clamps the reinforcing weft thread (25) and a guiding position (SF) that loosely surrounds the reinforcing thread (25).

16. A method according to claim 15, further comprising switching the holding device (37) out of the guiding position (SF) into the clamping position (SK) if the first gripper (35) has reached the second thread end position (31) of the reinforcing weft thread (25).

17. A method according to claim 15, wherein the first gripper (35) has a cutting device (45) and further comprising actuating the cutting device (45) after the first gripper (35) has reached the second thread end position (31) of the reinforcing weft thread (25) and the holding device (37) has been switched out of the guiding position (SF) into the clamping position (SK).

18. A method according to claim 12, further comprising fixing the inserted reinforcing weft thread (25) in multiple steps comprising:

Securing the inserted reinforcing weft thread (25) by a shed change of one or more binding warp threads (23);
Beating-up the reinforcing weft thread (25);
Using a shed change of one or more other binding warp threads (23) to fix the reinforcing weft thread (25).

* * * * *